(12) United States Patent
Gazit et al.

(10) Patent No.: US 9,680,614 B2
(45) Date of Patent: Jun. 13, 2017

(54) INTERLEAVING, MODULATION, AND LAYER MAPPING IN AN LTE PHYSICAL CONTROL CHANNEL

(75) Inventors: Ido Gazit, Haifa (IL); Eran Goldstein, Raanana (IL); Shai Kalfon, Hod HaSharon (IL)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 252 days.

(21) Appl. No.: 13/351,552

(22) Filed: Jan. 17, 2012

(65) Prior Publication Data

US 2013/0182782 A1 Jul. 18, 2013

(51) Int. Cl.
| | | |
|---|---|---|
| H04L 27/00 | (2006.01) | |
| H04L 5/00 | (2006.01) | |
| H04W 72/12 | (2009.01) | |
| H04L 25/03 | (2006.01) | |
| H04B 7/155 | (2006.01) | |
| H04L 1/00 | (2006.01) | |
| H04W 84/04 | (2009.01) | |
| H04B 7/04 | (2017.01) | |
| H04B 7/0413 | (2017.01) | |

(52) U.S. Cl.
CPC .......... *H04L 5/0007* (2013.01); *H04B 7/0413* (2013.01); *H04B 7/0473* (2013.01); *H04B 7/15542* (2013.01); *H04L 1/0071* (2013.01); *H04L 5/0053* (2013.01); *H04L 25/03866* (2013.01); *H04W 72/1289* (2013.01); *H04W 84/047* (2013.01)

(58) Field of Classification Search
CPC ... H04L 5/0053; H04L 5/0007; H04L 1/0071; H04L 25/03866; H04W 84/047; H04W 72/1289; H04B 7/0413; H04B 7/0473; H04B 7/15542
See application file for complete search history.

(56) References Cited

U.S. PATENT DOCUMENTS

| | | | |
|---|---|---|---|
| 2009/0067543 A1* | 3/2009 | Hsiao | H04B 7/0617 375/298 |
| 2010/0118800 A1* | 5/2010 | Kim et al. | 370/329 |
| 2011/0103295 A1* | 5/2011 | Khandekar et al. | 370/315 |
| 2012/0128039 A1* | 5/2012 | Kim | H04L 5/0048 375/211 |
| 2012/0282936 A1* | 11/2012 | Gao et al. | 455/450 |
| 2013/0010690 A1* | 1/2013 | Cheng et al. | 370/328 |

OTHER PUBLICATIONS

3GPP TS 36.211 V10.4.0 (Dec. 2011).*

* cited by examiner

*Primary Examiner* — Ross Varndell
(74) *Attorney, Agent, or Firm* — Sheridan Ross P.C.

(57) ABSTRACT

In described embodiments, a physical downlink control channel of a device operating in accordance with a 3GPP LTE standard is processed to provide interleaving, modulation and multi-layer mapping and pre-coding. A Resource Element Group interleaver applies interleaving to an input signal representing an input bitstream, and a modulator modulates the input signal. After interleaving and modulating the signal, a multi-layer mapper and pre-coder layer-maps and pre-codes the interleaved and modulated input signal into a plurality of different layers.

20 Claims, 4 Drawing Sheets

INTERLEAVING, MODULATION, AND LAYER MAPPING IN AN LTE PHYSICAL CONTROL CHANNEL

BACKGROUND OF THE INVENTION

Description of the Related Art

In a Long Term Evolution ("LTE") cellular system, the requirements of a high bit rate and low latency are more restrictive than prior cellular system standards. In order to meet these latency requirements, signal processing of an LTE-compliant device is desirably faster, increasing power consumption of the device. In addition, the high bit rate requirement might require large memory banks, also increasing complexity and power consumption of the device.

These requirements pose many challenges to developers of the LTE system. According to the $3^{rd}$ Generation Partnership Project ("3GPP") standard, LTE physical downlink control channel is implemented by several consecutive processes, which include, in this order: modulation, layer mapping and pre-coding, and interleaving. The present process, or "standard process", is described in Standard 3GPP 36.211 and Standard 3GPP 36.212, both of which are incorporated herein by reference in their entireties.

The modulation process receives a stream of bits as an input. According to the standard modulation scheme, every K=2 consecutive bits are mapped into one complex symbol. After modulation, a multilayer mapping and pre-coding process receives modulation symbols as an input. According to the standard mapping and pre-coding scheme, every M consecutive symbols are mapped into several layers where the gain and/or order permutation step is then applied. The basic unit for permutation is of length M, which is generally equivalent to the number of layers N (i.e. 1, 2, or 4). After mapping and pre-coding, a Resource Element Group ("REG") interleaver interleaves the REGs. According to the 3GPP Standard, one REG interleaver should operate on each layer, resulting in N REG interleaver processes, where N is also the number of antennas and can take the values of 1, 2, or 4.

The REG interleaver performs similarly to a bit interleaver, with the sole difference being that, in the REG interleaver, the basic manipulated unit is a REG instead of a bit as described in 3GPP 36.211. One REG is comprised of four consecutive symbols.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide for signal processing for a physical downlink control channel of a device operating in accordance with a 3GPP LTE standard. A Resource Element Group interleaver applies interleaving to an input signal representing bits of a Resource Element Group, and a modulator modulates the input signal representing the bits of the Resource Element Group. After interleaving and modulating, a multi-layer mapper and precoder maps and pre-codes the interleaved and modulated input signal representing the bits of the Resource Element Group into a plurality of different layers.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Referring in general to FIGS. 1-4, systems and methods for implementing interleaving and layer mapping an LTE physical downlink control channel according to several embodiments of the present invention are shown. Embodiments of the present invention might provide for implementing interleaving, modulation, and layer mapping processes that dramatically reduces hardware, processing time, and memory required to perform these processes. These embodiments might significantly reduce delay or processing requirements on each timeslot by reducing the number of Resource Element Group ("REG") interleaver processes by a factor of N, where N is the number of layers that are pre-coded.

In a standard process, which is defined in Section 6.8 of Standard 3GPP 36.211 ("the standard"), a physical downlink control channel is defined in terms of the steps of scrambling bits, modulating the scrambled bits to generate complex-valued symbols, transform preceding the symbols to generate complex-valued symbols separated into layers; performing REG interleaving; mapping the complex-valued symbols to resource elements; and generating a complex-valued time-domain Orthogonal Frequency-Division Multiplexing (OFDM) symbol for each antenna port. The interleaving is performed after the modulation and pre-coding steps and requires N interleavers. In accordance with embodiments of the present invention, however, mapping and pre-coding steps are performed after the interleaving and the modulation steps, thereby employing only a single interleaver. Since the result from the single interleaver is substantially equivalent to that provided by the standard process, so the processing by a transmitter employing an embodiment of the present invention is transparent to a receiver of the processed channel. Additionally, the inventive process might be employed with dedicated hardware, in software of a processor, and as a combined hardware/software implementation.

Figure 1:
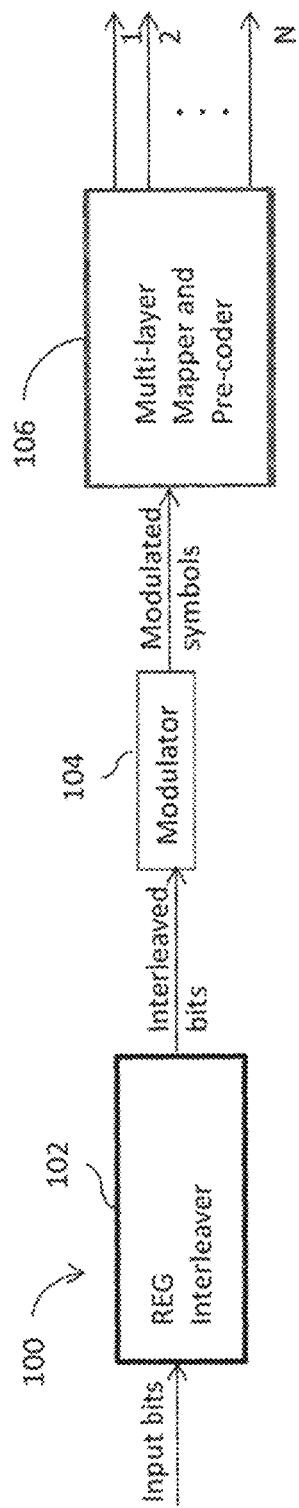
FIG. 1 shows a schematic representation of a system for implementing interleaving and layer mapping in an LTE physical downlink control channel according to a first exemplary embodiment of the present invention.
Figure 2:
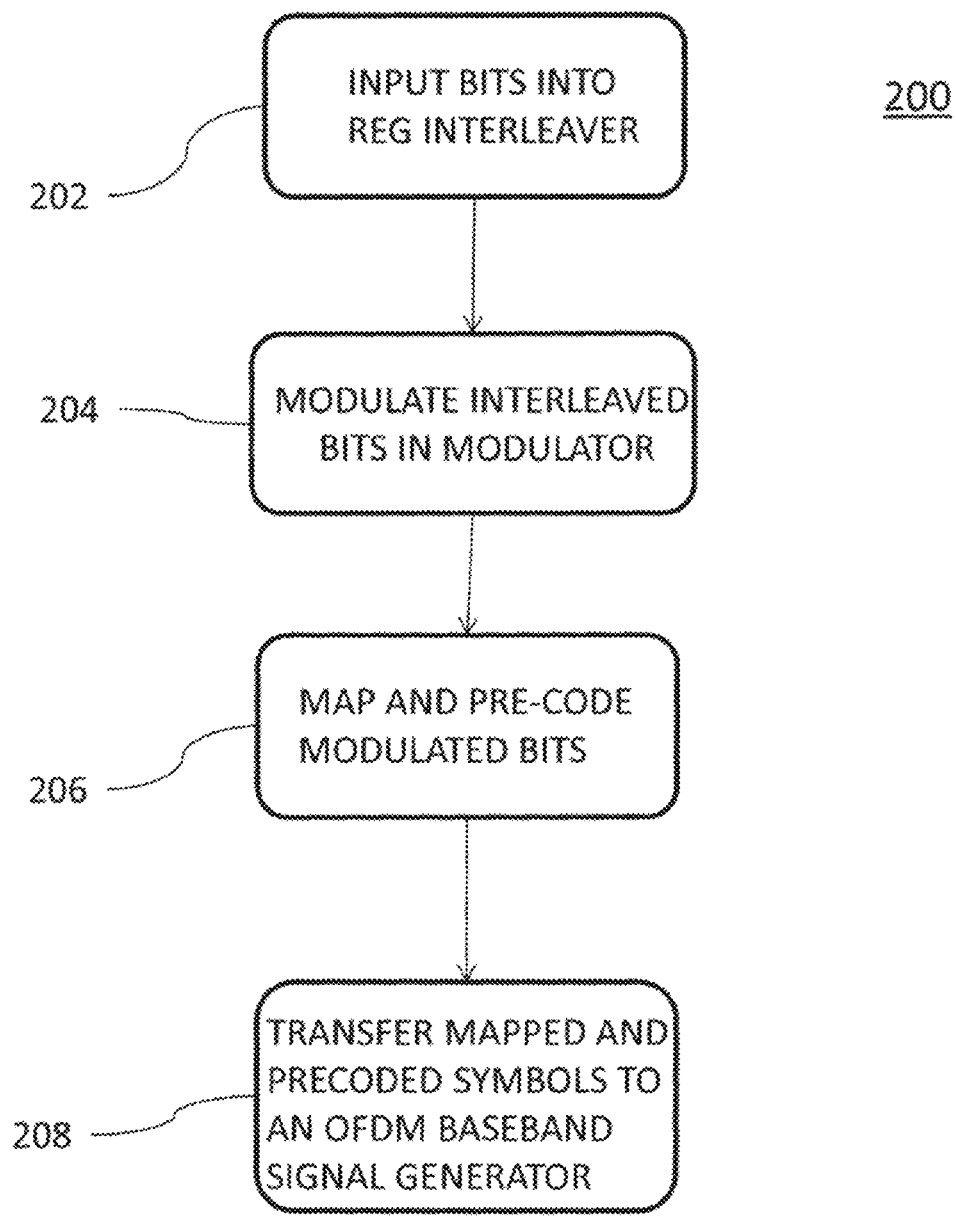
FIG. 2 is a flowchart showing operation of the system of FIG. 1.

Referring in detail to FIGS. 1 and 2, a first exemplary embodiment of the present invention might include apparatus 100 and a method 200 for implementing interleaving and layer mapping in an LTE physical control channel. Referring to FIG. 1, apparatus 100 comprises REG interleaver 102, a modulator 104, and a multi-layer mapper and pre-coder 106.

Referring to FIG. 2, at step 202, a plurality of input bits are input into and interleaved by a single modified REG interleaver 102. Because REG interleaver 102 accepts a stream of bits as its input, REG interleaver 102 operates on a modified REG, which is comprised of eight consecutive bits, and not symbols, as with a REG interleaver operating in accordance with a standard process. As a result of REG interleaver 102 operating on bits, as shown in FIG. 2, buses (not shown) load and write more REGs in each cycle than in the prior art. With the present invention, prior to modulation, each REG contains 8 bits, while after modulation, each REG contains 128 bits (4 complex symbols, with each complex symbol containing 32 bits). More bits can therefore be interleaved into each cycle using bit manipulations.

Next, in step 204, a modulator 104, which is located operationally downstream from REG interleaver 102, modulates the single stream of interleaved bits into modulated symbols. In step 206, the modulated bits are pre-coded and mapped into a plurality of different layers in a multilayer mapper and pre-coder. Finally, in step 208, the plurality of pre-coded layers is mapped to an OFDM baseband symbol generator for further processing and for ultimate transmission.

The modification according to apparatus 100 and method 200 does not change the outcome of the process from the prior art, because the sub processes of layer pre-coding and modulation are independent of the order of the REGs, which is permutated and changed by the REG interleaver. The apparatus 100 and method 200 described above, however, significantly reduce processing times and required memory for transmitting a channel as a signal over a wireless communication medium.

The mapping to resource elements according to method 200 is defined by operations on quadruplets of symbol bits (each "symbol bit" contain a sequence of 2 bits, with every 2 bits being converted into one complex symbol in the modulation stage). Let $z(i) = \langle y(4i), y(4i+1), y(4i+2), y(4i+3) \rangle$ denote symbol bits in quadruplet i. y contains 2 bits instead of a complex symbol of 16 bits (16 bits for real and 16 bits of imaginary).

The block of quadruplets $z(0), \ldots, z(M_{quad}-1)$, where $M_{symb\_bits}$ are all the symbol bits and $M_{quad\_bits} = M_{symb\_bits}/4$, is permuted, resulting in $w(0), \ldots, w(M_{quad\_bits}-1)$. The permutation is performed according to the sub-block interleaver in Section 5.1.4.2.1 of 36,212 of the standard, while the basic element for interleaving is a "symbol bits quadruplet," which is a quadruplet of symbol bits. In this exemplary embodiment, because the interleaving is performed before the pre-coding, the interleaving needs to be performed only once instead of N times on each antenna and, in addition, because the interleaving is also done before the modulating, the basic element for the interleaver ("symbol bits quadruplet") contains only 8 memory bits. The interleaving operation in general requires that the elements are loaded and written into a new location in memory, so if each element is smaller (therefore requiring less number of memory bits), the number of elements that can be loaded or written per cycle may be increased compared to the prior art.

Figure 3:
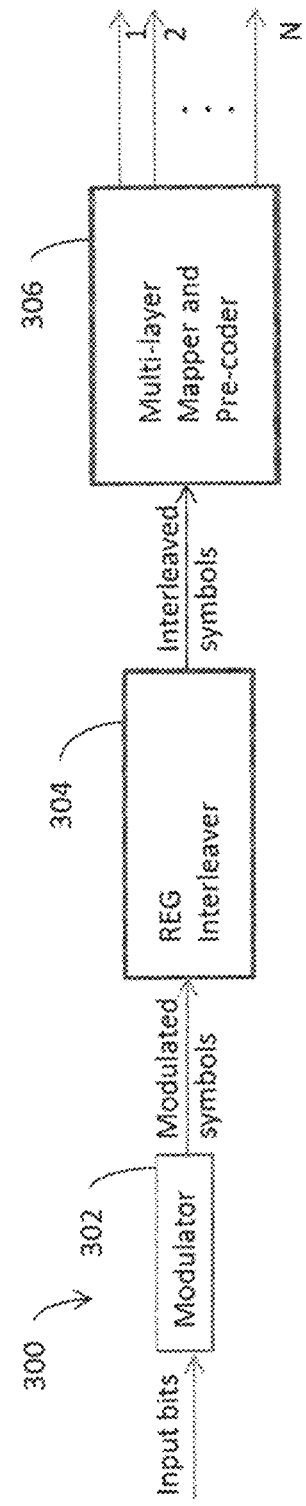
FIG. 3 shows a schematic representation of a system for implementing interleaving and layer mapping in an LTE physical downlink control channel according to a second exemplary embodiment of the present invention.
Figure 4:
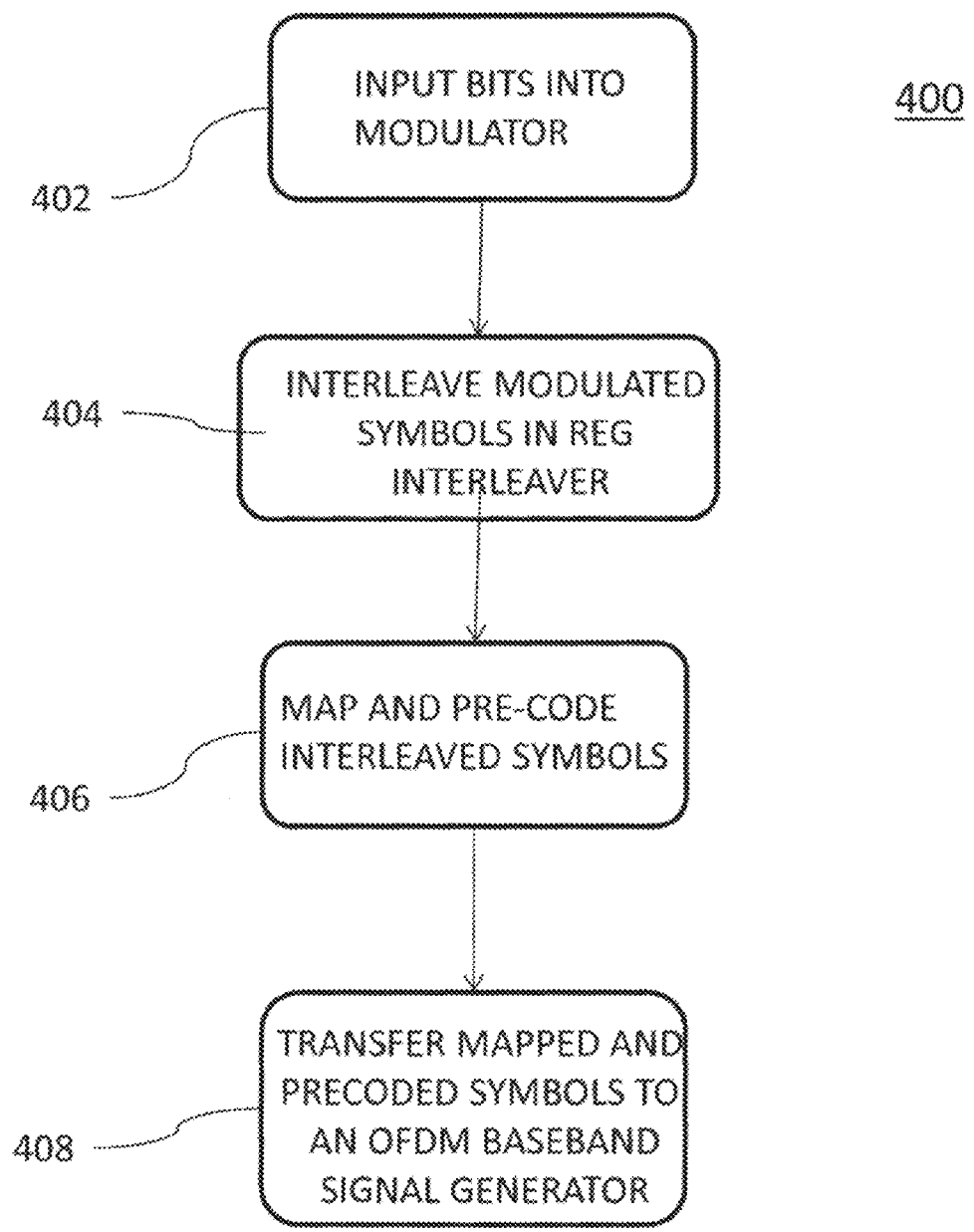
FIG. 4 is a flowchart showing operation of the system of FIG. 3.

Referring now to FIGS. 3 and 4, a second exemplary embodiment of the present invention might include an apparatus 300 and a method 400 for implementing interleaving and layer mapping in an LTE physical control channel. Instead of performing the interleaving steps first and then the modulation step, in apparatus 300 and method 400, the modulation step is performed first, and then the interleaving step.

In step 402, a plurality of input bits are input into a modulator 302, which modulates the input bits into modulated symbols. Next, in step 404, a single REG interleaver 304, which is operationally located downstream from modulator 302, interleaves the modulated symbols to form interleaved symbols. Because, in this embodiment, the modulation occurs before interleaving, REG interleaver 304 works on four consecutive symbols and performed only once for all the layers in contrast to the standard process. According to the standard, the REG interleaving is performed on each layer, which means the required REG interleaving is increased by factor of N (N is the number of layers).

In step 406 the interleaved symbols are pre-coded and mapped into different layers in a multilayer mapper and pre-coder 306. Finally, in step 408, the plurality of pre-coded layers is transferred to an OFDM baseband symbol generator.

The mapping to resource elements is defined by operations on quadruplets of complex-valued symbols. Let $z(i) = \langle y(4i), y(4i+1), y(4i+2), y(4i+3) \rangle$ denote symbol quadruplet i. The block of quadruplets $z(0), \ldots, z(M_{quad}-1)$, where $M_{symb}$ are all the complex-valued symbols and $M_{quad} = M_{symb}/4$, is permuted, resulting in $w(0), \ldots, w(M_{quad}1)$. The permutation is performed according to the sub-block interleaver in Section 5.1.4.2.1 of 36,212 of the standard, while the basic element for interleaving is a "symbol quadruplet," which is quadruplets of complex-valued symbols. In this embodiment, because the interleaving is performed before the pre-coding, the interleaving needs to be done on the symbols only once, instead of N times on each antenna for further processing and for ultimate transmission.

Figure 5:
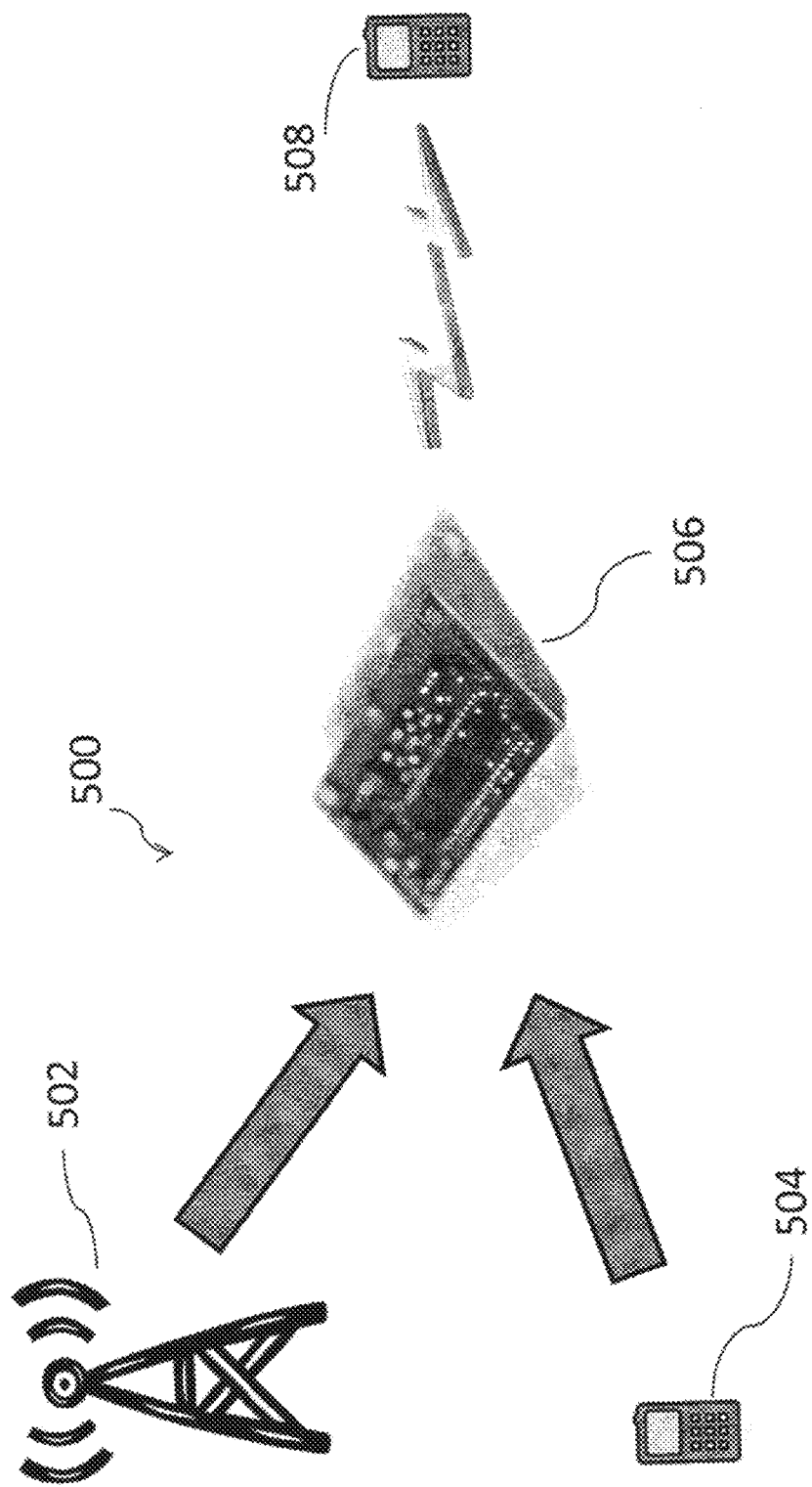
FIG. 5 is a schematic representation of the inventive system used in a transmission system.

As illustrated in FIG. 5, apparatus 100 and its corresponding method 200 or apparatus 300 and its corresponding method 400 might be used in an exemplary transmission system 500. Transmission system 500 includes one of a base station 502 and a first wireless device 504, which might each include a radio module 506. Radio module 506 includes either apparatus 100 or apparatus 300 and performs either of method 200 or method 400 and then wirelessly transmits the modulated symbols to a receiver, such as, for example, a second wireless device 508.

The methods 200 and 400 described above are independent from each other and can be implemented separately from and interchangeably with each other. Alternatively, both methods 200 and 400 can be used. Additionally, a common feature to both apparatus 100 and apparatus 300 is that the multi-layer mapper and pre-coder is operatively located downstream of the REG interleaver and the modulator.

Embodiments of the present invention improve REG processing by more than a factor of N as compared to REG processing according to, for example, the 3GPP LTE standard described herein. Consequently, implementations of the present invention might exhibit reduced delay and increased processing speed compared to those implementations employing REG processing in accordance with the 3GPP LTE standard. In addition, implementations including one or more embodiments of the present invention might require less memory, improving cost and reducing complexity of a given implementation.

As used herein, an element is "operatively located downstream" from a second element when an operation is performed by the second element before a subsequent operation is performed on the element.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention may be implemented as circuit-based processes, including possible implementation as a single integrated circuit (such as an ASIC or an FPGA), multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of signal processing for a physical downlink control channel of a device compatible with cellular communication, the method comprising:

interleaving, utilizing a single Resource Element Group interleaver, an input signal representing a stream of bits of a modified Resource Element Group, wherein the single Resource Element Group interleaver interleaves the stream of bits of the modified Resource Element Group;

modulating the input signal representing the stream of bits of the modified Resource Element Group; and layer-mapping and pre-coding, after both the interleaving step and the modulating step, the modulated and interleaved input signal into a plurality of different layers, wherein said interleaving is configured to operate on multiples of symbol bits each containing a sequence of two consecutive bits of the modified Resource Element Group.

2. The method of claim 1, wherein the interleaving step is performed before the modulating step.

3. The method of claim 2, wherein the modified Resource Element Group includes a set of consecutive bits.

4. A method of signal processing for a physical downlink control channel of a device compatible with cellular communication, the method comprising:

interleaving, utilizing a single Resource Element Group interleaver, an input signal representing bits of a modified Resource Element Group, wherein the single Resource Element Group interleaver interleaves the bits of the modified Resource Element Group;

modulating the interleaved input signal; and layer-mapping and pre-coding, after both the interleaving step and the modulating step, the modulated and interleaved input signal into a plurality of different layers, wherein the modified Resource Element Group includes eight bits, and wherein said interleaving is configured to operate on quadruplets of symbol bits each containing a sequence of two consecutive bits of the modified Resource Element Group.

5. The method of claim 4, wherein modulating the modified Resource Element Group produces four symbols.

6. The method of claim 5, wherein each of the four symbols includes 32 bits.

7. The method of claim 1, wherein the interleaved input signal representing the bits of the modified Resource Element Group is provided as a single stream of interleaved bits as input to the modulating step.

8. The method of claim 1, wherein the method is implemented as steps in a processor of at least one of a wireless device and a base station.

9. The method of claim 1, further comprising transmitting the plurality of different layers.

10. An apparatus for signal processing for a physical downlink control channel of a device compatible with cellular communication, the apparatus comprising:

a single Resource Element Group interleaver configured to apply interleaving to an input signal representing a stream of bits of a modified Resource Element Group, wherein the single Resource Element Group interleaver interleaves the stream of bits of the modified Resource Element Group;

a modulator configured to modulate the input representing the stream of bits of the modified Resource Element Group; and a multi-layer mapper and pre-coder configured to layer-map and pre-code the interleaved and modulated input into a plurality of different layers, wherein the single Resource Element Group interleaver is configured to operate on multiples of symbol bits each containing a sequence of two consecutive bits of the modified Resource Element Group.

11. The apparatus of claim 10, wherein the interleaver applies interleaving to the input signal before the modulator.

12. The apparatus of claim 11, wherein the modified Resource Element Group includes a set of consecutive bits.

13. The apparatus of claim 12, wherein the modified Resource Element Group includes eight bits, and wherein the single Resource Element Group interleaver is configured to operate on quadruplets of symbol bits each containing a sequence of two consecutive bits of the modified Resource Element Group.

14. The apparatus of claim 13, wherein the modulator modulates the modified Resource Element Group to produce four symbols.

15. The apparatus of claim 14, wherein each of the four symbols includes 32 bits.

16. The apparatus of claim 10, wherein the Resource Element Group interleaver provides as a single stream of interleaved bits as input to the modulator.

17. The apparatus of claim 10, wherein the apparatus includes at least one of a wireless device and a base station.

18. The apparatus of claim 10, further comprising a radio module adapted to transmit the plurality of different layers to a wireless communication medium.

19. The apparatus of claim 10, further comprising a receiver adapted to receive the plurality of different layers from a wireless communication medium.

20. A non-transitory machine-readable storage medium, having encoded thereon program code, wherein, when the program is executed by a machine, the machine implements a method for signal processing for a physical downlink control channel of a device compatible with cellular communication, comprising the steps of:

interleaving an input signal representing a stream of bits of a modified Resource Element Group utilizing a single Resource Element Group interleaver, wherein the single Resource Element Group interleaver interleaves the stream of bits of the modified Resource Element Group;

modulating the input signal representing the stream of bits of the modified Resource Element Group;

mapping and pre-coding, after the interleaving and modulating steps, the modulated and interleaved input signal into a plurality of different layers wherein said interleaving is configured to operate on multiples of symbol bits each containing a sequence of two consecutive bits of the modified Resource Element Group; and transmitting the plurality of different layers.

* * * * *